Figure 1:
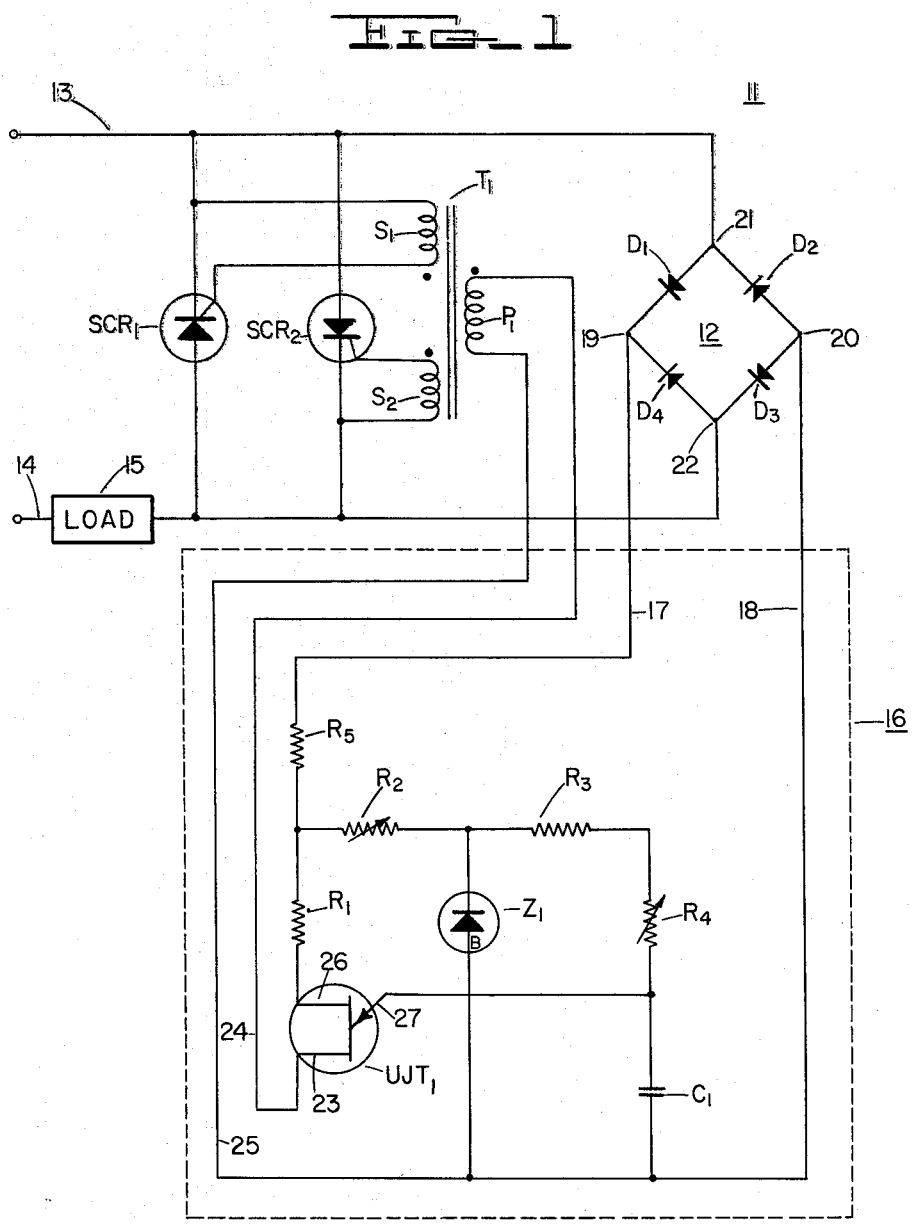

United States Patent Office 3,146,392
Patented Aug. 25, 1964

3,146,392
CONTROL CIRCUITS EMPLOYING UNIJUNCTION TRANSISTORS FOR FIRING CONTROLLED RECTIFIERS
Tage P. Sylvan, Liverpool, N.Y., assignor to General Electric Company, a corporation of New York
Filed Aug. 2, 1961, Ser. No. 128,747
6 Claims. (Cl. 323—22)

This invention relates to control circuits for controlled rectifiers and more particularly to such circuits employing unijunction transistors to fire one or a pair of controlled rectifiers at a predetermined phase angle wherein the improved circuit effectively compensates for supply line voltage variations.

The power supplied from an alternating current source can be controlled by alternately firing a pair of controlled rectifiers at a predetermined point in each cycle of the alternating current supply or by firing a single controlled rectifier at a predetermined point in each half cycle. Such circuits are essentially an electronic version of a variac and are used in applications such as lamp dimmers, temperature controllers and phase controlled power supplies.

In conventional phase control circuits used to fire a controlled rectifier, such as a silicon controlled rectifier, voltage regulation would normally be achieved by the use of a voltage regulator at the input to the circuit or by means of a feed-back control system. Both of these systems of regulation require the use of relatively expensive components. Unless some means of voltage regulation is provided, the power output varies proportionally with variations in the supply voltage. It is desirable, therefore, that a more economical system be provided for regulation in a phase control circuit, that does not require the use of a voltage regulator or a feedback system.

Accordingly, an object of this invention is to provide an improved phase control circuit.

It is another object of the invention to provide an improved phase control circuit employing a pair of controlled rectifiers which are alternately fired at a predetermined point at each half cycle by a control circuit employing unijunction transistors.

It is a more specific object of the present invention to provide a phase control circuit employing at least one controlled rectifier and a unijunction transistor firing circuit wherein the firing circuit inherently compensates for variations of the supply voltage.

The foregoing and other objects and advantages of the invention are realized by a control circuit employing at least one controlled rectifier and a unijunction transistor firing circuit wherein a zener diode is connected so that the charging voltage of a timing capacitor is equal to the breakdown voltage of the zener diode and is substantially constant over the half cycle prior to the instant when the controlled rectifier is fired. Further, a voltage divider action is provided by the inclusion of resistive means connected in the circuit so that the interbase voltage of the unijunction transistor is caused to be substantially equal to the breakdown voltage of the zener diode plus a fractional part of the line voltage as determined by the voltage divider action of the resistive means. Since the peak point voltage of the unijunction transistor varies proportionally with the interbase voltage, at any given phase angle the peak point voltage increases as the line voltage increases. It was found further that as the peak point voltage increases, the point in the half cycle at which the controlled rectifier is fired is delayed and consequently the conduction angle of the controlled rectifier is decreased. In this manner the decrease in conduction angle accomplishes a reduction in the power supplied to the load which off-sets the increased power to the load resulting from the increased line voltage.

According to the invention, the power output can be effectively regulated by adjusting the resistance ratio of the resistive means providing the voltage divider action in the unijunction transistor firing circuit thereby controlling the change in the peak point voltage so that it will compensate for deviations in the supply voltage from a predetermined level.

Figure 2:
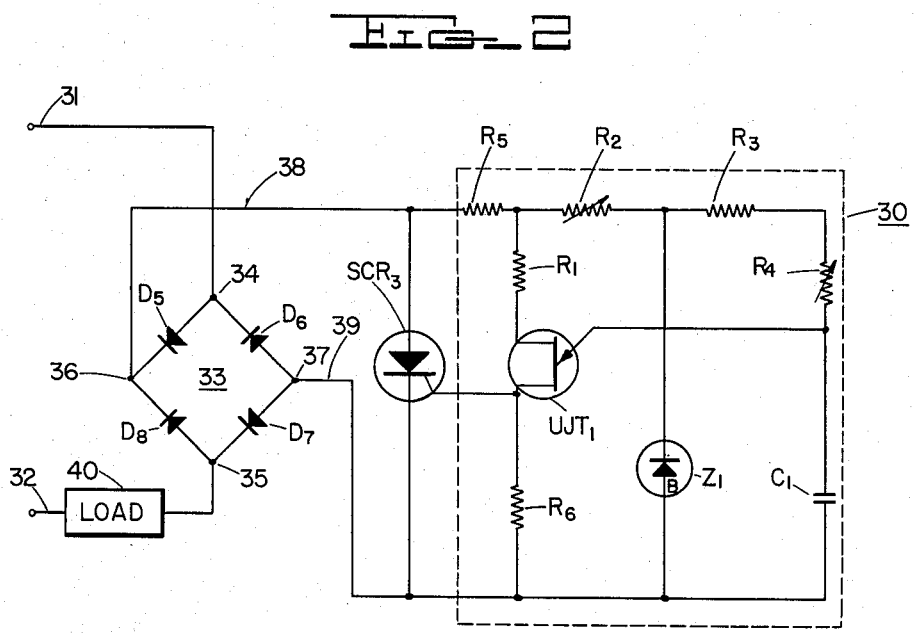
Figure 3:
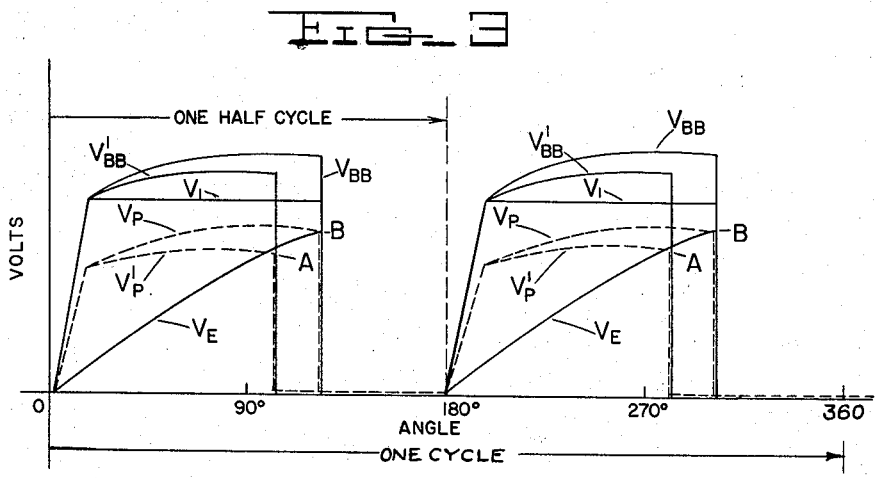

The subject matter which I regard as my invention is set forth in the appended claims. The invention itself, however, together with further objects and advantages thereof may be understood by referring to the following description taken in connection with the accompanying drawings in which:

FIG. 1 is a schematic circuit diagram of a control circuit illustrating one embodiment of the invention;

FIG. 2 is a schematic circuit diagram of a control circuit illustrating another embodiment of the invention; and FIG. 3 illustrates the voltage wave forms of an emitter voltage $V_E$, the charging voltage $V_1$, the peak voltage $V_P$, the interbase voltage $V_{BB}$ corresponding to normal line voltage and the peak point voltage $V'_P$ and interbase voltage $V'_{BB}$ corresponding to line voltage below normal.

Having more specific reference now to the schematic diagram of the control circuit illustrated in FIG. 1, it will be seen that the phase control circuit 11 includes a pair of controlled rectifiers $SCR_1$, $SCR_2$, a pulse transformer $T_1$, a bridge rectifier 12, a unijunction transistor $UJT_1$, a zener diode $Z_1$, resistors $R_1$, $R_2$, $R_3$, $R_4$, $R_5$ and capacitor $C_1$. The controlled rectifiers $SCR_1$, $SCR_2$ are connected in inverse parallel relationship across a pair of input terminal leads 13, 14 which are provided for connection to a suitable alternating current supply such as a 60 cycle, 115 volt A.C. supply. A load 15 is shown schematically connected in circuit with input terminal lead 14.

It will be seen that a current flows through the load 15 only when one of the pair of controlled rectifiers $SCR_1$ or $SCR_2$ is triggered into a conducting state. One of the controlled rectifiers $SCR_1$, $SCR_2$ controls the interval of current conduction to the load 15 in each half cycle of the alternating current supply. Thus, the control circuit 11 by alternately triggering one and then the other of the pair of controlled rectifiers $SCR_1$, $SCR_2$ at a predetermined point in each half cycle thereby controls the power supplied to the load 15.

The controlled rectifiers $SCR_1$, $SCR_2$ used in the illustrative embodiment of the invention shown in FIG. 1 and also controlled rectifier $SCR_3$ illustrated in FIG. 2 are PNPN semiconductors having three terminals, an anode represented by the arrow symbol, a cathode represented by the line drawn through the apex of the arrow symbol and a gate represented by the diagonal line extending from the cathode. Preferably, silicon controlled rectifiers may be used as switching elements since the operating characteristics of a silicon controlled rectifier are such that it conducts in a forward direction with a forward characteristic very similar to that of an ordinary rectifier when a gate signal is applied. Thereafter, the controlled rectifier continues conduction even after the gate signal is removed provided a minimum holding current is supplied to the controlled rectifier.

When a positive voltage is applied to the outside P layer and a negative voltage is applied to the outside N layer, the two outside junctions are biased in a forward direction while the inner junctions are reversely biased. Under these conditions, current does not flow through the controlled rectifier except for a small leakage current. When the voltage is increased to a breakover voltage, the current gain of the device increases to unity at which time the current through the controlled rectifier increases suddenly and becomes the function of the applied voltage and the load impedance. Since a current pulse supplied to the gate lowers the breakover voltage, the gate electrode can be used for controlling the firing of the controlled rectifiers.

The current pulse required to fire the controlled rectifiers $SCR_1$ and $SCR_2$ is supplied by a unijunction transistor firing circuit 16 shown enclosed in the dashed rectangle. Input lead 17 and 18 connect firing circuit 16 with output terminals 19, 20 of the bridge rectifier 12, which includes diodes $D_1$, $D_2$, $D_3$, $D_4$ and a pair of input terminals 21, 22. Although a bridge rectifier is shown in the illustrative embodiments of the invention, it will be appreciated that other suitable rectifying means may be employed in the practice of the invention.

Continuing with the detailed description of the circuit shown in FIG. 1, it will be seen that unijunction transistor $UJT_1$ has a base-one electrode 23 connected in series circuit with one end of the primary winding $P_1$ of pulse transformer $T_1$ by pulse output lead 24. The other end of the primary winding $P_1$ is connected in circuit with capacitor $C_1$ and input lead 18 by means of pulse output lead 25. A resistor $R_1$ may be connected in circuit with the base-two electrode 26 in order to compensate for temperature variations of the peak point voltage of unijunction transistor $UJT_1$. In accordance with the invention, I have connected the zener diode $Z_1$ in circuit with a resistor $R_2$, which may, if desired, be variable or fixed, and a resistor $R_5$. The resistors $R_2$, $R_5$ and zener diode $Z_1$ are connected across the input leads 17, 18 of the firing circuit 16.

The resistor $R_2$ has been included in the firing circuit 16 to provide a voltage divider action so that the interbase voltage of unijunction transistor $UJT_1$ is equal to the breakdown voltage of the zener diode $Z_1$ plus a fractional part of the line voltage across input leads 17, 18 as determined by the resistance ratio provided by the resistors $R_2$ and $R_5$. The resistors $R_2$ and $R_4$ are variable resistors in order that regulation may be provided over a wide range of output voltages. Resistors $R_3$ and $R_4$, which may be combined into a single resistor, if desired, are provided to control the charging rate of the capacitor $C_1$ and the point in the alternating current half cycle at which the unijunction transistor $UJT_1$ is triggered thereby providing a control over the conduction period of controlled rectifiers $SCR_1$ and $SCR_2$.

The pulse transformer $T_1$ provides A.C. coupling and D.C. isolation between the firing circuit 16 and the gates of the controlled rectifier $SCR_1$, $SCR_2$. It is comprised of the primary winding $P_1$, a first secondary winding $S_1$ which is connected across the gate and cathode of controlled rectifier $SCR_1$ and a second secondary winding $S_2$ which is connected across the gate and cathode of controlled rectifier $SCR_2$.

The unijunction transistor $UJT_1$ employed in the illustrative embodiment of the invention was a three terminal transistor including the base-one electrode 23, the base-two electrode 26 and an emitter 27. If the voltage applied at the emitter 27 is less than the peak point voltage of unijunction transistor $UJT_1$, the emitter 27 is reversed biased and only a small leakage current will flow. If the applied emitted voltage equals or exceeds the peak point voltage, current will begin to flow and at this instant the unijunction transistor $UJT_1$ assumes a negative resistance characteristic, the resistance being inversely proportional to the current flowing thereto. Hence, the unijunction transistor $UJT_1$ is triggered.

A control circuit 11, as shown in FIG. 1 and employing the following circuit constants, was operated to provide a regulated alternating current power supply:

Controlled rectifiers $SCR_1$, $SCR_2$ _____ General Electric C35B silicon controlled rectifiers.
Pulse transformer $T_1$ ____ Sprague 31Z286.
Diodes $D_1$, $D_2$, $D_3$, $D_4$ ____ IN1695.
Unijunction transistor $UJT_1$ _____ 2N1671A.
Resistor $R_1$ _____ 390 ohms.
Resistor $R_2$ _____ 0–1,000 ohms.
Resistor $R_3$ _____ 2,700 ohms.
Resistor $R_4$ _____ 0–50,000 ohms.
Resistor $R_5$ _____ 3,300 ohms.
Capacitor $C_1$ _____ 0.2 microfarad.

The control circuit 11 was adjusted to give optimum regulation at a 25 volt root mean square output and a 115 volt, 60 cycle alternating current input. It was found that when the line voltage decreased to 100 volts, the change in the output voltage was less than 0.1 volt with the output voltage set to range from 10 volts to 30 volts.

In FIG. 2, I have illustrated a modification of the control circuit shown in FIG. 1 wherein the unijunction transistor firing circuit 30, shown in the dashed rectangle, is adapted to trigger a single control rectifier $SCR_3$. In the arrangement shown in FIG. 2, the silicon controlled rectifier $SCR_3$ and the unijunction transistor firing circuit 30 exercise phase control on each half cycle of the alternating current cycle applied to input terminal leads 31, 32. In FIG. 2, I have identified the corresponding part of the firing circuit 16 shown in FIG. 2 by the same reference numerals as used in FIG. 1.

A bridge certifier 33 includes the diodes $D_5$, $D_6$, $D_7$, $D_8$ and input terminals 34, 35 connected in circuit with input terminal leads 31, 32, which are provided for connection to a suitable alternating current supply. A load 40 is connected in circuit with input terminal lead 32. A first and a second firing circuit input lead 38 and 39 are connected in circuit with output terminals 36, 37 of bridge rectifier 33. A single phase, full wave rectifier voltage is applied across the firing circuit 30.

The unijunction transistor firing circuit 30 is comprised of the unijunction transistor $UJT_1$, a temperature compensating resistor $R_1$, zener diode $Z_1$ and resistors $R_2$, $R_3$, $R_4$, $R_5$ and $R_6$. The variable resistor $R_4$ or potentiometer is used to provide adjustments in the output voltage or power supplied to a load 40. By properly adjusting the variable resistor $R_2$, precise regulation of the output voltage is achieved over a given range of output voltages, and the change in the load voltage corresponding to a given variation in the line voltage can be substantially maintained at zero. The charging rate of the capacitor $C_1$ determines the point in the alternating current half cycle at which the unijunction transistor $SCR_3$ is fired. The additional resistor $R_6$ is provided so that a predetermined voltage drop occurs thereacross when capacitor $C_1$ is discharged to fire controlled rectifier $SCR_3$.

Having reference now to the schematic circuit diagram shown in FIG. 1, the operation of the control circuit 11 illustrated therein will now be more fully described. The operation is initiated by energizing the input terminal leads 13, 14 from a suitable alternating current supply and thereby energizing the input terminals 21, 22 of the bridge rectifier 12. The bridge rectifier 12 converts the alternating current supplied at the input terminals 21, 22 to a full wave rectified voltage at the output terminals 19, 20.

Taking an arbitrary half cycle of the alternating current supply and having reference now more specifically to the wave form of the charging voltage $V_1$ shown in FIG. 3, it will be seen that the charging voltage is essentially constant over the initial portion of the half cycle until the instant when the unijunction transistor $UJT_1$ is fired. It will be seen from the waveform $V_{BB}$ that the interbase voltage $V_{BB}$ of unijunction transistor $UJT_1$ is not constant during this interval but is equal to the breakdown voltage of the zener diode $Z_1$ plus a small fractional part of the line voltage across output terminals 19, 20 as determined by the voltage dividing action of the resistors $R_2$ and $R_5$.

In FIG. 3, I have also shown the waveforms $V'_{BB}$ and $V'_P$ which represent the instantaneous interbase voltage and peak point voltage of the unijunction transistor corresponding to a decreased value of line voltage.

For any given setting of the variable resistor or potentiometer $R_4$, when the line voltage decreases, the interbase voltage will also decrease proportionately as is shown by the waveform $V'_{BB}$. The corresponding peak voltage waveforms $V_P$ and $V'_P$ are substantially similar in shape since the peak point voltage is equal to the standoff ratio times the interbase voltage. The instantaneous emitter voltage $V_E$ rises exponentially, as shown by the waveform $V_E$, since the charging voltage is substantially constant during a greater portion of the half cycle.

When the emitter voltage $V_E$ is equal to the peak point voltage $V_P$, as indicated at points A, B of FIG. 3, unijunction transistor $UJT_1$ is forward biased and turns on. In this condition, the resistance between the emitter and base-one electrode of the unijunction transistor $UJT_1$ is low. Capacitor $C_1$ is discharged causing a pulse of current to flow through the primary winding $P_1$ of the pulse transformer $T_1$. Assuming that controlled rectifier $SCR_1$ is forward biased during this half cycle, the pulse applied to the gate will fire controlled rectifier $SCR_1$. Thus, the instantaneous current flow will be from input terminal lead 14 through the load 15, controlled rectifier $SCR_1$ and to input terminal lead 13.

Since the two controlled rectifiers $SCR_1$, $SCR_2$ are connected back-to-back, one will conduct during the positive half of the cycle and the other will conduct during the negative half of the cycle. It will be appreciated that as the firing angle of the controlled rectifiers $SCR_1$, $SCR_2$ is delayed by the firing circuit 16, the amount of power supplied to the load 15 is decreased. As the firing angle is advanced, the power supplied to load 15 is increased. The conducting controlled rectifier is turned off at the end of each half cycle due to the voltage reversal that takes place at the end of the half cycle.

Having reference again to FIG. 3, it will be apparent from the waveforms $V_{BB}$ and $V'_{BB}$ that as the line voltage across the input terminal leads 13, 14 deviates from a predetermined voltage level so that a decreased line voltage is supplied thereto, the firing point of the unijunction transistor $UJT_1$ and the controlled rectifiers $SCR_1$, $SCR_2$ is advanced. Therefore, the conduction interval of controlled rectifiers $SCR_1$, $SCR_2$ is increased to compensate for the voltage deviation. Thus, the power supplied to the load increases and offsets the decrease of power which would result from a deviation in line voltage from a predetermined level. In accordance with the invention it is possible to readily achieve regulation by the use of the resistor $R_2$ in a voltage divider arrangement whereby the peak point voltage is caused to vary with variations in the line voltage thereby delaying or advancing the firing angle of the unijunction transistor, as may be required to regulate the voltage applied to the load 15. Voltage regulation in the control circuit 11 is obtained without need for a feedback control system or a voltage regulator.

It will be apparent that control of the phase angle at which the controlled rectifiers $SCR_1$, $SCR_2$ are fired, can be readily achieved by connecting a NPN transistor in shunt with the capacitor $C_1$ as is well-known in the art. By so connecting the transistor, charging current can be diverted from the capacitor $C_1$ and the firing angle of the unijunction transistor $UJT_1$ can be controlled in response to current supplied to the NPN transistor.

The operation of the control circuit 30 shown in FIG. 2 is substantially similar to the control circuit 11 shown in FIG. 1. The capacitor $C_1$ begins to charge at the start of the first instantaneous rectified current wave. The point at which the emitter voltage becomes equal to the peak point voltage of the unijunction transistor $UJT_1$, is determined by the setting of variable resistor $R_4$ which controls the output voltage of the circuit. The setting of the resistor $R_2$ controls the amount that the peak point or interbase voltage of the unijunction transistor $UJT_1$ will vary as the line voltage varies to achieve regulation of the load voltage. Until unijunction transistor $UJT_1$ is fired at some predetermined point in each half cycle, controlled rectifier $SCR_3$ is in a blocking state and no current flows to the load 40.

Assuming that the controlled rectifier $SCR_3$ is fired in the positive half cycle of the alternating current supply, the instantaneous current follows a path which may be traced from input terminal lead 31 through input terminal 34 of the bridge rectifier 33, diode $D_5$, lead 38, controlled rectifier $SCR_3$, lead 39, output terminal 37, diode $D_7$, input terminal 35, the load 40 and to input terminal lead 32. In the next half cycle, when $SCR_3$ is again triggered, the path of instantaneous current traverses a reverse path. It may be traced from input terminal lead 32, through load 40, input terminal 35, diode $D_8$, output terminal 36, lead 38, controlled rectifier $SCR_3$, lead 39, output terminal 37, diode $D_6$, input terminal 34, and to input terminal lead 31.

Referring again to FIG. 3, the voltage waveforms shown therein apply equally to the unijunction transistor $UJT_1$ in firing circuit 30 of FIG. 2. It will be seen that when the supply voltage falls below its normal operating level, voltage waveforms $V'_{BB}$ and $V'_E$ are proportionately decreased during the period when the charge on the capacitor $C_1$ is constant. As indicated at point A, the firing point of unijunction transistor $UJT_1$ is advanced to increase the conduction period of controlled rectifier $SCR_3$ in order to compensate for the decreased voltage input.

From the foregoing description of the operation of the illustrated embodiments of the invention, it will be seen that it is possible to readily achieve regulation of the output voltage by providing a voltage divider action so that the interbase voltage of the unijunction transistor is caused to be substantially equal to the breakdown voltage of the zener diode plus a fractional part of the supply voltage. As compared with conventional unijunction transistor control circuits, the unijunction transistor firing phase control circuit in accordance with the invention makes it possible to obtain regulation without a voltage regulator and without a complex feedback control system.

While the present invention has been described by reference to a preferred embodiment thereof, it is to be understood that modifications may be made by those skilled in the art without actually departing from the invention. It is therefore intended by the appended claims to cover all such modifications that fall within the true spirit and scope of the invention.

What I claim as new and desire to secure by Letters Patent of the United States is:

1. A control circuit comprising a first and second input lead for connection in circuit with a supply having a predetermined voltage, a unijunction transistor having a base-one, a base-two and emitter electrodes, a capacitor connected in circuit with said emitter electrode and said base-one electrode, a first resistive means connected in circuit with said first input lead and said base-two electrode of said unijunction transistor, a second resistive means, a zener diode having a cathode and an anode, said zener diode having a predetermined breakdown voltage, circuit means connecting said second resistive means and said zener diode in circuit with said first resistive means and said second input lead so that said first and second resistive means provide a voltage divider action thereby causing the interbase voltage of said unijunction transistor to be substantially equal to the breakdown voltage of said zener diode and a fractional part of the supply voltage, a third resistive means, said second and third resistive means being connected in circuit with the cathode of said zener diode, said third resistive means and said capacitor being serially connected across said zener diode, said voltage divider action of said first and second resistors compensating for variations in the supply voltage by varying the interbase voltage of the unijunction transistor.

2. A control circuit for firing at least one controlled rectifier at a predetermined phase angle, said control circuit comprising a first and a second input lead for connection in circuit with a direct current supply for providing a predetermined voltage, a unijunction transistor having a base-one, a base-two and an emitter electrode, a pair of pulse output leads, one of said output leads being connected in circuit with the base-one electrode of said unijunction transistor and the other of said pulse output leads being connected in circuit with said capacitor, a first resistive means connected in circuit with said first input lead and said base-two electrode of the unijunction transistor, a second resistive means, a diode means having a cathode and an anode and a predetermined breakdown voltage, circuit means connecting said diode means and said second resistive means across said unijunction transistor and in circuit with said first resistive means so that said first and second resistive means provide a voltage divider action whereby the interbase voltage of the unijunction transistor is caused to be substantially equal to the breakdown voltage of said diode means plus a fractional part of the supply voltage, a third resistive means, said second and third resistive means being connected in circuit with the cathode of said diode means, said third resistive means and said capacitor being serially connected across said diode means, said voltage divider action of said first and second resistive means compensating for variations in the supply voltage by varying the interbase voltage of the unijunction transistor and changing the firing angle of said unijunction transistor in order to vary the conduction interval of the controlled rectifier to regulate the output voltage.

3. A control circuit for firing at least one controlled rectifier at a predetermined phase angle comprising a first and a second input lead for connection in circuit with a supply having a predetermined voltage level, a unijunction transistor having a base-one, a base-two and an emitter electrode, a capacitor connected in circuit with said emitter electrode and said first input lead, a pair of pulse output leads, one of said pulse output leads being connected in circuit with said base-one electrode and the other of said pulse output leads being connected in circuit with said second input lead, a zener diode having a cathode and an anode, said zener diode having a predetermined breakdown voltage, a variable resistor, said first resistor, said variable resistor and said zener diode being connected in circuit across said first and second input leads, said variable resistor and said zener diode being connected across said unijunction transistor, said first and said variable resistor providing a voltage divider action whereby the interbase voltage of said unijunction transistor is substantially equal to the breakdown voltage of said zener diode plus a fractional part of the supply voltage across said input terminal leads when said circuit is energized, a third resistor, said third resistor and said capacitor being connected in circuit across said zener diode, said voltage divider action of said first and second resistor compensating for deviations in the supply voltage from said predetermined voltage level by varying the interbase voltage of the unijunction transistor so that the firing angle of the unijunction transistor is changed to vary the conduction interval of the controlled rectifier and thereby regulate the output voltage.

4. A control circuit for firing at least one controlled rectifier at a predetermined phase angle, said control circuit comprising a first and second input lead for connection in circuit with a power supply having a predetermined voltage level, a unijunction transistor having a base-one, a base-two and an emitter electrode, a timing capacitor connected in circuit with said emitter electrode and with said second input lead, a first resistor connected in circuit with said first input lead and said base-two electrode of said unijunction transistor, a first and a second pulse output lead provided for connection in circuit with the gate and cathode of the controlled rectifier, said first pulse output lead being connected in circuit with the base-one electrode of said unijunction transistor and said second pulse output lead being connected in circuit with said timing capacitor, a zener diode having a cathode and an anode, said zener diode having a predetermined breakdown voltage, a second resistor, circuit means connecting said second resistor and said zener diode in circuit with said first resistor and said second input lead so that said first and second resistors provide a voltage divider action whereby the interbase voltage of said unijunction transistor is caused to be substantially equal to the breakdown voltage of said zener diode plus a fractional part of the supply voltage, a third resistor connected in series circuit relationship with said timing capacitor, circuit means connecting said third resistor and capacitor across said zener diode, said voltage divider action of said first and second resistors compensating for deviations in the voltage applied across said input terminal leads from said predetermined voltage level by varying the interbase voltage so that the firing angle of the unijunction transistor is adjusted to correct the output voltage.

5. A control circuit for controlling the power supplied from an alternating current supply comprising a pair of input terminal leads for connection across said alternating current supply, a pair of controlled rectifiers connected in inverse parallel relationship across said input terminal leads, a rectifying means having input terminals and output terminals, said input terminals being connected in circuit with said input terminal leads and a first and a second input lead, said first and second input leads being connected with the output terminals of said rectifying means, a unijunction transistor having a base-one, a base-two and an emitter electrode, a capacitor connected in circuit with said emitter electrode and said second input lead, a first resistor connected in circuit with said first input lead and said base-two electrode of said unijunction transistor, a second resistor, a zener diode having a cathode and anode, said zener diode having a predetermined breakdown voltage, circuit means connecting said second resistor and said zener diode in circuit with said first resistor and said second input lead so that said first and second resistors provide a voltage divider action whereby the interbase voltage of said unijunction transistor is caused to be substantially equal to the breakdown voltage of said zener diode plus a fractional part of the supply voltage, a third resistor connected in series circuit relation with said capacitor, said third resistor and capacitor being serially connected across said zener diode, a pair of pulse output leads, circuit means connecting said pulse output leads in circuit so that said controlled rectifiers are alternately fired at a predetermined point in each half cycle of the alternating current supply, said voltage divider action of said first and second resistor compensating for variations in the voltage of the power supply by varying the interbase voltage of the unijunction transistor as the supply voltage varies in order to adjust the firing angle of the unijunction transistor and thereby vary the conduction time of the controlled rectifiers to correct the output voltage.

6. A control circuit for controlling the amount of power supplied to a load in each half cycle of an alternating current supply, said circuit comprising a pair of input terminal leads for connection across the alternating current supply, a bridge rectifier having a pair of input terminals and a pair of output terminals, said input terminal leads being connected in circuit wth said input terminals of said bridge rectifier, a first input lead and a second input lead connected in circuit with the output terminals of said bridge rectifier, a controlled rectifier connected across said first and second input leads, a unijunction transistor having a base-one, a base-two and an emitter electrode, a capacitor connected in circuit with said emitter electrode and said second input lead, a first resistor connected in circuit with said first input lead and said base-two electrode of said unijunction transistor, a second resistor, a zener diode having a cathode and an anode, said zener diode having a predetermined breakdown voltage, said first resistor, said second resistor and said zener diode being connected in circuit across said first and second input leads, said first and second resistors providing a voltage divider action whereby the interbase voltage of said unijunction transistor is caused to be substantially equal to the breakdown voltage of said zener diode plus a fractional part of the voltage at the output of said bridge rectifier, a third resistor connected in series circuit relation with said capacitor, said third resistor and said capacitor being connected across said zener diode, circuit means connecting said base-one electrode of said unijunction transistor in circuit with the gate and cathode of said controlled rectifier so that said controlled rectifier is fired at a predetermined phase angle in each half cycle, said voltage divider action of said first and second resistors compensating for variations in the voltage of the power supply by varying the interbase voltage of the unijunction transistor so that the firing angle of the unijunction transistor is varied thereby varying the conduction time of the controlled rectifier to compensate for said voltage variation.

References Cited in the file of this patent

"G.E. Controlled Rectifier Manual," Phase Controlled A.C. Switch, FIGURE 7.5, pp. 86–90, Mar. 21, 1960.